United States Patent
Ullrich

(10) Patent No.: US 10,702,981 B2
(45) Date of Patent: Jul. 7, 2020

(54) VACUUMING-OFF DEVICE

(71) Applicant: Robert Bosch GmbH, Stuttgart (DE)

(72) Inventor: Andre Ullrich, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 15/377,446

(22) Filed: Dec. 13, 2016

(65) Prior Publication Data

US 2017/0173775 A1 Jun. 22, 2017

(30) Foreign Application Priority Data

Dec. 18, 2015 (DE) .................. 10 2015 226 021

(51) Int. Cl.
| | |
|---|---|
| *B25D 17/20* | (2006.01) |
| *A47L 7/00* | (2006.01) |
| *B23Q 11/00* | (2006.01) |
| *B23B 47/34* | (2006.01) |
| *B23Q 1/00* | (2006.01) |

(52) U.S. Cl.
CPC ............ *B25D 17/20* (2013.01); *A47L 7/0095* (2013.01); *B23B 47/34* (2013.01); *B23Q 1/0009* (2013.01); *B23Q 11/0046* (2013.01); *B25D 2217/0057* (2013.01)

(58) Field of Classification Search
CPC ............ B25D 17/20; B25D 2217/0057; A47L 7/0095; B23B 47/34; B23Q 1/0009; B23Q 11/0046; B23Q 11/0071; B23Q 11/0042; B23Q 11/006; B23Q 11/08; Y10T 409/304088
USPC .......... 173/198, 197; 409/137; 451/456, 453
See application file for complete search history.

(56) References Cited

U.S. PATENT DOCUMENTS

| | | | | |
|---|---|---|---|---|
| 4,515,504 A | * | 5/1985 | Moore, Sr. ......... | B23Q 11/0053 15/257.9 |
| 6,615,930 B2 | * | 9/2003 | Bongers-Ambrosius ..................... | B08B 15/04 173/198 |
| 7,017,680 B2 | * | 3/2006 | Arich ................... | B23Q 1/0009 173/171 |
| 7,182,150 B2 | * | 2/2007 | Grossman ............ | B23Q 1/0009 173/171 |

(Continued)

FOREIGN PATENT DOCUMENTS

EP 2 228 171 B1 11/2011

OTHER PUBLICATIONS

Video: Bosch GDE 18V-16 Professional—the integrated dust extractor for 18-volt rotary hammers. Published on Jan. 2, 2018. Retrieved on Oct. 21, 2019 from URL https://www.youtube.com/watch?v=p80wZORUgjY (Year: 2018).*

*Primary Examiner* — Hemant Desai
*Assistant Examiner* — Valentin Neacsu
(74) *Attorney, Agent, or Firm* — Maginot, Moore & Beck LLP

(57) ABSTRACT

A vacuuming-off device includes at least one vacuuming-off unit that has at least one interface. The interface is mechanically and electrically connectable to a hand-held power tool, in particular to a hammer drill and/or chipping hammer, in at least one first application. The vacuuming-off device further includes an adapter unit that, in at least one second application, is connectable to the interface. The adapter unit has at least one connecting unit that is connectable to at least one energy supply.

12 Claims, 3 Drawing Sheets

(56) References Cited

U.S. PATENT DOCUMENTS

| | | | | |
|---|---|---|---|---|
| 7,281,886 B2* | 10/2007 | Stoerig | B23Q 11/0046 175/213 |
| 7,425,109 B2* | 9/2008 | Simm | B23Q 11/0046 173/198 |
| 8,443,914 B2* | 5/2013 | Bito | B23Q 11/0046 173/198 |
| 8,479,964 B2* | 7/2013 | Furusawa | A47L 5/365 123/46 SC |
| 8,967,923 B2* | 3/2015 | Lerch | B23Q 11/0071 408/67 |
| 9,114,491 B2* | 8/2015 | Kakiuchi | B23Q 11/0046 |
| 9,776,296 B2* | 10/2017 | Brewster | B23Q 11/00 |
| 2002/0129949 A1* | 9/2002 | Bongers-Ambrosius | B08B 15/04 173/217 |
| 2002/0134811 A1* | 9/2002 | Napier | B24B 23/04 227/131 |
| 2004/0231871 A1* | 11/2004 | Arich | B23Q 1/0009 173/217 |
| 2004/0251041 A1* | 12/2004 | Grossman | B23Q 1/0009 173/217 |
| 2005/0089380 A1* | 4/2005 | Stoerig | B23Q 11/0046 408/67 |
| 2005/0273969 A1* | 12/2005 | Watson | A47L 9/2889 15/344 |
| 2007/0113369 A1* | 5/2007 | Cochran | A47L 5/14 15/327.5 |
| 2011/0008117 A1* | 1/2011 | Kasuya | B23Q 11/0046 408/67 |
| 2011/0008118 A1* | 1/2011 | Yoshikane | B23Q 11/0046 408/67 |
| 2011/0226499 A1* | 9/2011 | Kakiuchi | B23Q 11/0046 173/75 |
| 2011/0226502 A1* | 9/2011 | Bito | B23Q 11/0046 173/197 |
| 2011/0239398 A1* | 10/2011 | Furusawa | A47L 5/365 15/339 |
| 2011/0308830 A1* | 12/2011 | Furusawa | B23Q 11/0046 173/198 |
| 2012/0298391 A1* | 11/2012 | Kakiuchi | B23Q 11/0046 173/77 |
| 2013/0031879 A1* | 2/2013 | Yoshikane | B23Q 11/0046 55/356 |
| 2013/0031881 A1* | 2/2013 | Machida | B23Q 11/0046 55/385.1 |
| 2013/0055523 A1* | 3/2013 | Yoshikane | B28D 7/02 15/347 |
| 2013/0055527 A1* | 3/2013 | Machida | B23Q 11/0046 15/415.1 |
| 2013/0136549 A1* | 5/2013 | Appel | B23Q 11/0046 408/56 |
| 2013/0183111 A1* | 7/2013 | Lerch | B23Q 11/0071 408/56 |
| 2013/0213683 A1* | 8/2013 | Brewster | B23Q 11/00 173/198 |
| 2014/0261551 A1* | 9/2014 | Usselman | A47L 9/2842 134/18 |
| 2015/0238059 A1* | 8/2015 | Foell | A47L 9/2868 15/352 |
| 2016/0250731 A1* | 9/2016 | Wong | B23Q 11/0071 408/56 |

* cited by examiner

VACUUMING-OFF DEVICE

This application claims priority under 35 U.S.C. § 119 to patent application no. DE 10 2015 226 021.6, filed on Dec. 18, 2015 in Germany, the disclosure of which is incorporated herein by reference in its entirety.

BACKGROUND

A vacuuming-off device for a battery-operated power drill, which can be connected to the battery-operated power drill, is already known from EP 2 228 171 B1.

SUMMARY

The disclosure is based on a vacuuming-off device having at least one vacuuming-off unit that has at least one interface, which is designed for mechanical and electrical connection to a hand-held power tool, in particular to a hammer drill and/or chipping hammer, in at least one first application.

It is proposed that the vacuuming-off device have an adapter unit that, in at least one second application, can be connected, and in particular is connected, to the interface, and that has at least one connecting unit for connection to at least one energy supply.

The design of the vacuuming-off device according to the disclosure makes it possible to achieve a high degree of variability with respect to application of the vacuuming-off device. Advantageously, a multiple functionality can be achieved. In particular, the vacuuming-off device may also be used as a hand-held vacuum cleaner. Advantageously, a universal application capability can be achieved. In particular, advantageously, a modular hand-held power tool system, having a vacuuming-off device, can be provided. Advantageously, retrofitting of a vacuuming-off device is possible for a variety of hand-held power tools.

"Designed" is to be understood to mean, in particular, specially programmed, configured and/or equipped. That an object is designed for a particular function is to be understood to mean, in particular, that the object fulfils and/or executes this particular function in at least one application state and/or operating state. A "vacuuming-off device" in this context is to be understood to mean, in particular, a device designed to remove dirt, in particular produced during use of hand-held power tools, in particular by use of an air flow and/or a vacuum, in particular a portable vacuuming-off device. A "vacuuming-off unit" in this context is to be understood to mean, in particular, a unit designed to vacuum-off and/or trap particles of dust and/or material, in particular particles of dust and/or material produced during use of the hand-held power tool. In particular, the vacuuming-off unit is realized as a hand-held power tool vacuuming-off unit. A "hand-held power tool" in this context is to be understood to mean, in particular, a machine for performing machining work on workpieces, but advantageously a power drill, a hammer drill and/or percussion hammer, a chipping hammer, a saw, a plane, a screwdriver, a router, a sander, an angle grinder, a garden appliance and/or a multifunction tool. In particular, the hand-held power tool has a preferably electrical drive unit. Preferably, the hand-held power tool has an electric power supply unit, which comprises a chargeable energy storage device and/or a mains power connection.

A "mechanical connection" of a first object to a second object is to be understood in this case to mean, in particular, that a movement of the first object relative to the second object is restricted. Preferably, in the case of a movement of the second object, the first object is moved concomitantly, in particular homogeneously. Particularly preferably, a position of the first object is constant relative to the second object. In particular, the interface can be connected to the hand-held power tool, at least partially, in a positive-locking manner That a first object "can be connected, at least partially, in a positive-locking manner" to a second object is to be understood in this context to mean, in particular, that at least 10%, advantageously at least 20%, particularly advantageously at last 30%, preferably at least 40%, and particularly preferably at last 60% of a surface of the first object can be connected to the second object in a positive-locking manner. An "electrical connection" of a first object to a second object is to be understood in this context to mean, in particular, a contact between the two objects that enables a current flowing through the first object also to be able to flow through the second object, at least partially. Advantageously, the interface is designed for connection to the hand-held power tool by a user. Particularly advantageously, the interface is designed for connection to the hand-held power tool without the use of tools.

Preferably, the interface has at least one latching means, which is designed to fix a hand-held power tool, connected to the interface, in position relative to the interface. Further, the interface has, in particular, at least one electrical contact point. Advantageously, the electrical contact point, when the hand-held power tool has been connected to the interface, is connected to an electrical contact point of the hand-held power tool. Particularly advantageously, when the hand-held power tool has been connected to the interface, the vacuuming-off unit and the hand-held power tool are supplied by the same energy supply, in particular by an energy supply of the hand-held power tool.

In particular, the adapter unit can be connected, at least partially, to the vacuuming-off unit in a positive-locking manner Advantageously, the adapter unit can be connected to the latching means of the interface. Particularly advantageously, the adapter unit has at least one electrical contact point, in particular a contact point that, when in a mounted state, can be connected to at least one electrical contact point of the vacuuming-off unit. In particular, the connecting unit may be designed for connection to a mains voltage, in particular by means of a corresponding power supply unit.

Further, it is proposed that the connecting unit be designed for connection to at least one battery, in particular a storage battery pack. Alternatively or additionally, the connecting unit may be designed for connection to a mains voltage, in particular by means of a mains power cable and/or a corresponding power supply unit. Particularly advantageously, an energy storage device of a battery connected to the connecting unit may be charged by means of the adapter unit if the connecting unit is additionally connected to a mains voltage. Preferably, the vacuuming-off device has at least one connecting adapter, which is designed to adapt the connecting unit to at least one further battery, in particular a further storage battery pack, in particular to differing types of battery. Advantageously, a flexible application capability is thereby achieved. In addition, off-mains working is thereby made possible.

In a preferred design of the disclosure, it is proposed that the adapter unit have at least one fastening, which is designed for an alternative connection to a further hand-held power tool. In particular, the fastening is designed for the alternative connection to the further hand-held power tool in a state in which the adapter unit has been connected to the interface of the vacuuming-off unit. In particular, the fastening is designed for fixing a position of the vacuuming-off unit relative to the further hand-held power tool. Advantageously, the fastening is designed for operation by a user. Particularly advantageously, the fastening is designed to effect a connection, to the further hand-held power tool, that can be made without the use of tools and/or undone without the use of tools. Preferably, the vacuuming-off device has at least one fastening adapter, which is designed to adapt the fastening to at least one third hand-held power tool, in particular to differing types of hand-held power tool. Advantageously, this enables the vacuuming-off device to be used with variously designed hand-held power tools. In particular, a single vacuuming-off unit can be used in combination with a plurality of hand-held power tools. Advantageously, a space-saving application is thereby made possible. In addition, this makes it possible to provide an energy supply to the vacuuming-off unit, and to achieve the capability for mounting on differing hand-held power tools.

In addition, the disclosure is based on a vacuuming-off device having at least one vacuuming-off unit that has at least one interface, which is designed for mechanical and electrical connection to a hand-held power tool, in particular to a hammer drill and/or chipping hammer, in at least one first application.

It is proposed that the vacuuming-off device have an adapter unit that, in at least one second application, can be connected, and in particular is connected, to the interface, and that has at least one connecting unit for connection to at least one energy supply.

The design of the vacuuming-off device according to the disclosure makes it possible, advantageously, to achieve a high degree of variability with respect to application of the vacuuming-off device. Further, advantageously, it is made possible to use the vacuuming-off device with variously designed hand-held power tools. In particular, advantageously, a single vacuuming-off unit can be used in combination with a plurality of hand-held power tools. Advantageously, a space-saving application can thereby be made possible.

Advantageously, the fastening is designed for operation by a user. Particularly advantageously, the fastening is designed to effect a connection, to the further hand-held power tool, that can be made without the use of tools and/or undone without the use of tools. Preferably, the vacuuming-off device has at least one fastening adapter, which is designed to adapt the fastening to at least one third hand-held power tool, in particular to differing types of hand-held power tool.

In a preferred design of the disclosure, it is proposed that the adapter unit have at least one actuating element that is designed to activate and/or deactivate the vacuuming-off unit. Preferably, the actuating element is a switch, in particular a toggle switch, or a pushbutton or a key. Further, it is conceivable for the adapter unit to have a main switch and an additional start/stop switch that is different from the main switch. A high degree of operating convenience can thereby be achieved. Moreover, working safety can thereby be increased.

In a particularly preferred design of the disclosure, it is proposed that the adapter unit have at least one handle. Preferably, the handle is integrally connected to a housing of the vacuuming-off device. "Integrally" is to be understood to mean, in particular, connected at least by adhesive force, for example by a welding process, a bonding process, an injection process and/or another process considered appropriate by persons skilled in the art, and/or, advantageously, formed in one piece such as, for example, by being produced from a casting and/or by being produced in a single or multi-component injection process and, advantageously, from a single blank. Particularly preferably, the housing of the adapter unit constitutes a handle. Advantageously, the actuating element is disposed in a region of the handle. Particularly advantageously, the main switch is disposed at a distance from the handle, and/or the start/stop switch is disposed in a region of the handle. This makes it possible, advantageously, to provide a good handling capability. In particular, advantageously, this enables the vacuuming-off device, in particular as a hand-held vacuum cleaner, to be guided in a reliable manner.

Further, it is proposed that the vacuuming-off device have at least one vacuuming-off nozzle, which can be placed on and/or attached to the vacuuming-off unit, in at least one operating state. In particular, the vacuuming-off nozzle is designed for use in an operating state in which the vacuuming-off device is used as a hand-held vacuum cleaner. Advantageously, the vacuuming-off unit has a receiving region for the vacuuming-off nozzle, which is realized differently from a vacuuming-off region designed for vacuuming-off in an operating state in which the vacuuming-off device is connected to a hand-held power tool. Particularly advantageously, the vacuuming-off region is obstructed and/or blocked and/or deactivated as a result of the vacuuming-off nozzle being placed on and/or attached. Preferably, the receiving region for the vacuuming-off nozzle is obstructed and/or blocked and/or deactivated as a result of the vacuuming-off nozzle being removed and/or pulled off. Particularly preferably, vacuuming-off is effected either in the vacuuming-off region or by means of the vacuuming-off nozzle. This makes it possible, advantageously, to adapt to a field of application. Moreover, this makes it possible to improve a handling capability of the vacuuming-off device as a hand-held vacuum cleaner.

Advantageously, the adapter unit has at least one sensor unit that is designed, in the second application, to identify at least on activation state of the further hand-held power tool. In particular, the sensor unit may be realized as a vibration sensor and/or as an inductive sensor and/or as a noise sensor. This makes it possible, advantageously, to provided automated identification of operation of the hand-held power tool.

Particularly advantageously, the adapter unit has a control unit, which is designed, in the second application, to activate and/or deactivate the suction unit in dependence on the identification of the sensor unit. Advantageously, in the case of an identification of an activation of the further hand-held power tool, the vacuuming-off unit is activated. Particularly advantageously, in the case of an identification of a deactivation of the further hand-held power tool, the vacuuming-off unit is deactivated. Advantageously, this enables operating convenience to be improved. Moreover, a high degree working safety can thereby be achieved.

The vacuuming-off device according to the disclosure is not intended in this case to be limited to the application and embodiment described above. In particular, the vacuuming-off device may have individual elements, components and units that differ in number from a number stated herein, in order to fulfill a principle of function described herein.

BRIEF DESCRIPTION OF THE DRAWINGS

Further advantages are disclosed by the following description of the drawings. The drawings show an exemplary embodiment of the disclosure. The drawings, the description, and the claims contain numerous features in combination. Persons skilled in the art will also expediently consider the features individually and combine them to create appropriate further combinations.

There are shown in.

DETAILED DESCRIPTION

Figure 1:
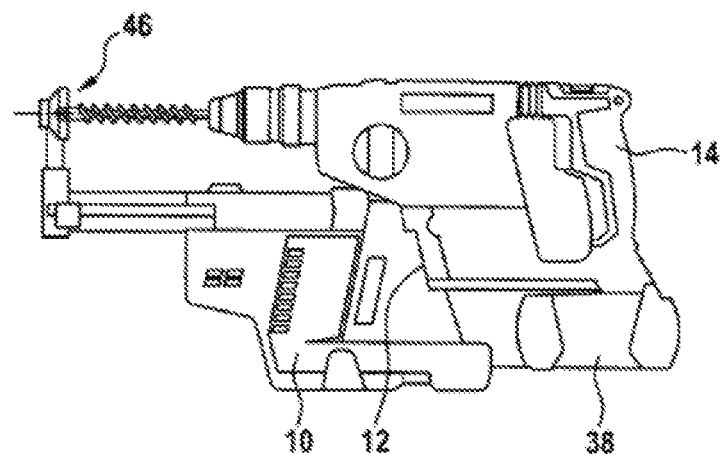
FIG. 1 a hand-held power tool having a vacuuming-off unit of the vacuuming-off device, in a schematic side view, FIG. 2 an interface of the vacuuming-off unit, in a perspective representation, FIG. 3 the vacuuming-off device, in a schematic side view, FIG. 4 a further hand-held power tool having the vacuuming-off device, in a schematic side view, and FIG. 5 a system having the vacuuming-off device, the hand-held power tool and the further hand-held power tool, in a schematic representation.

Shown in a schematic side view in FIG. 1 is a hand-held power tool 14, realized as a battery-operated power drill, which is mechanically and electrically connected to an interface 12 of a vacuuming-off unit 10 of a vacuuming-off device 54. When in a mounted state, the interface 12 is connected to the hand-held power tool 14 in a positive-locking manner Via the interface 12, the vacuuming-off unit 10 is supplied with energy from a storage battery pack 38 of the hand-held power tool 14. The vacuuming-off unit 10 has a vacuuming-off region 46, in which dirt and/or dust produced during operation of the hand-held power tool 14 is vacuum-cleaned.

Figure 2:
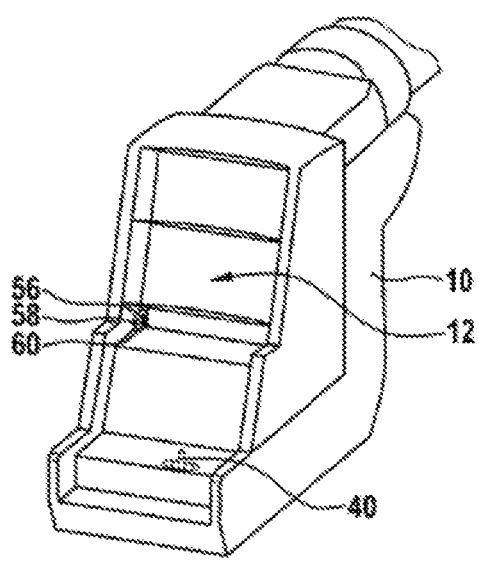

FIG. 2 shows the interface 12 of the vacuuming-off unit 10, in a perspective representation. The interface 12 has electrical contact points 56, 58, 60 that, when in a mounted state, are connected to corresponding electrical contacts (not shown) of the hand-held power tool 14. The interface additionally has a latching element 40, by means of which the hand-held power tool 14 can be fixed to the interface 12. In the present case, a connection between the hand-held power tool 14 and the interface 12 can be made and undone without the use of tools.

Figure 3:
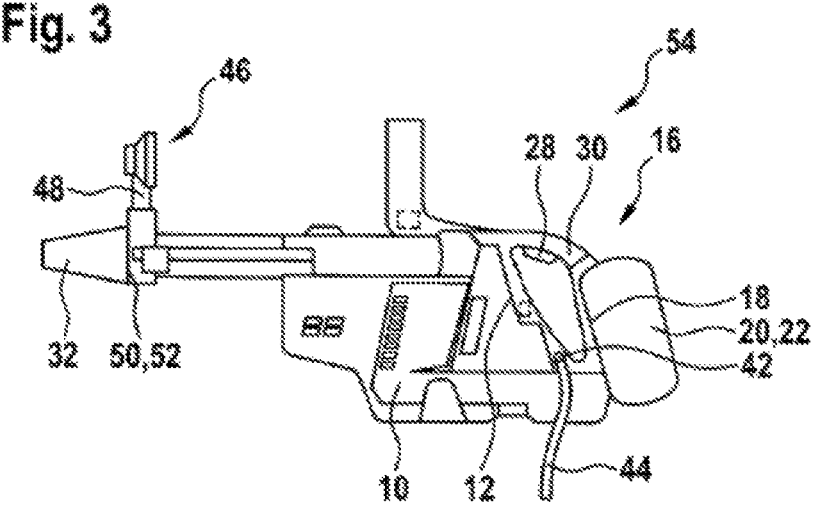

FIG. 3 shows the vacuuming-off device 54 in a schematic side view. The vacuuming-off device 54 has the vacuuming-off unit 10. In addition, the vacuuming-off device 54 has an adapter unit 16, which can be electrically and mechanically connected to the interface 12 of the vacuuming-off unit 10. The adapter unit 16 has a connecting unit 18, which, in the present case, is electrically and mechanically connected to an external energy supply 20 realized as a battery 22. In the present case, the battery 22 is realized as a storage battery pack. The connecting unit 18 additionally has a socket 42, which is designed for connection to a mains power cable 44. The vacuuming-off device 54 can be supplied with energy by means of the battery 22 and/or via a mains voltage. In addition, in the present case, the battery 22 can be charged by means of the mains voltage, via the socket 42. It is also conceivable, however, for the connecting unit 18 to be designed only for connection to an external energy supply (not shown) realized as a storage battery pack. It is likewise conceivable for the connecting unit 18 to be designed only for connection to an external energy supply (not shown) realized as a mains electricity supply system.

In addition, the adapter unit 16 has a handle 30. Disposed on the handle 30 is an actuating element 28, realized as a toggle switch, that is designed, when the adapter unit 16 is in a mounted state, to switch the vacuuming-off unit 10 on and off. It is additionally conceivable for the adapter unit to have an additional main switch (not shown).

The vacuuming-off device 54 has a vacuuming-off nozzle 32, which can be placed on a vacuuming-off nozzle receiving region 52 of the vacuuming-off unit 10. A suction line portion 48 that leads to the vacuuming-off region 46 of the vacuuming-off unit 10 is obstructed as a result of the vacuuming-off nozzle 32 having been placed on. Vacuum cleaning is then effected through the vacuuming-off nozzle 32. A suction line portion 50 that leads to the vacuuming-off nozzle receiving region is obstructed upon removal of the vacuuming-off nozzle 32. Vacuum cleaning is then effected through the vacuuming-off region 46.

Figure 4:
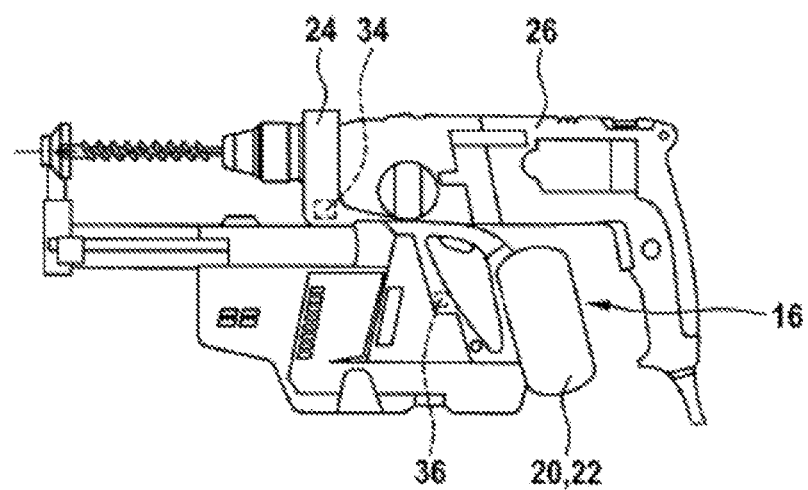

FIG. 4 shows a further hand-held power tool 26 having the vacuuming-off device 54, in a schematic side view. The further hand-held power tool 26 is realized as a cable-connected hammer drill. The adapter unit 16 has a fastening 24 that is designed for mechanical connection to the further hand-held power tool 26. In the present case, the connection can be made without the use of tools, and undone without the use of tools. During operation, the further hand-held power tool 26 is supplied with energy via the mains voltage. In addition, during operation, the vacuuming-off unit 12 is supplied with energy via the battery 22 connected to the adapter unit 16. The adapter unit 16 has a sensor unit 34, which is designed to identify operation of the further hand-held power tool 26. In the present case, the sensor unit 34 is realized as an inductive sensor. In addition, the adapter unit 16 has a control unit 36, which is designed to activate and deactivate the vacuuming-off unit 10 in dependence on an identification of the sensor unit 34. Upon switch-on of the further hand-held power tool 26, the sensor unit 34 detects a flow of current in the hand-held power tool 26. The control unit 36 then activates the vacuuming-off unit 10. Upon switch-off of the further hand-held power tool 26, the sensor unit 34 detects a drop of a flow of current in the hand-held power tool 26. The control unit 36 then deactivates the vacuuming-off unit 10.

Alternatively, it is conceivable for the adapter unit to be realized as in FIGS. 1 to 4, but not to have the fastening, sensor unit and control unit described above (not shown). Otherwise, for such an alternative adapter unit, reference may be made to all of the description above that does not relate to the use of the vacuuming-off device with a further hand-held power tool. The vacuuming-off unit may then be used with hand-held power tool or in combination with the adapter unit, as a hand-held vacuum cleaner.

It is additionally conceivable, as a further alternative, for the adapter unit to be realized as in FIGS. 1 to 4, but not to have the connecting unit described above (not shown). Otherwise, for such an alternative adapter unit, reference may be made to all of the description above that does not relate to the connecting unit and the use thereof. In the case of operation with the further hand-held power tool, such an alternative adapter unit could be supplied with energy via the further hand-held power tool, for example by means of a corresponding electrical contact point.

Figure 5:
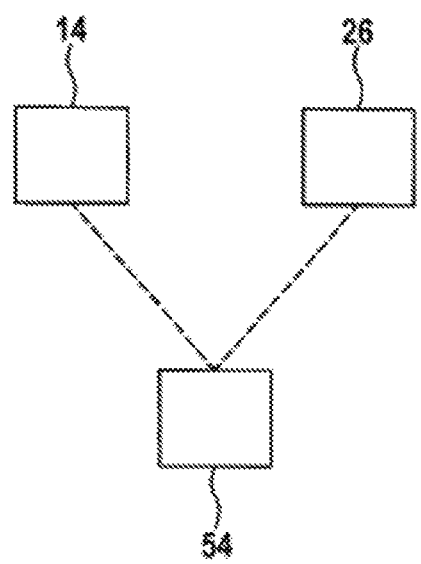

FIG. 5 shows a system having the vacuuming-off device 54, the hand-held power tool 14 and the further hand-held power tool 26, in a schematic representation. As sown in the exemplary embodiment of FIGS. 1 to 4, the first hand-held power tool 14 or the second hand-held power tool 26 may be connected to the vacuuming-off device 54, or the vacuuming-off device 54 may be operated as a hand-held vacuum cleaner.

What is claimed is:

1. A vacuuming-off system, comprising:
at least one vacuuming-off unit having an interface, the interface including a fastening element and an electrical contact point; and
an adapter unit having at least one connecting unit configured to connect to at least one external energy supply, wherein:
in a first configuration with the adapter unit removed, the fastening element mechanically connects the at least one vacuuming-off unit directly to a hand-held power tool and the electrical contact point electrically connects the at least one vacuuming-off unit directly to the hand-held power tool such that energy is supplied to the at least one vacuuming-off unit from the hand-held power tool in a first operating state,
in a second configuration, the fastening element mechanically connects the at least one vacuuming-off unit directly to the adapter unit and the electrical contact point electrically connects the at least one vacuuming-off unit directly to the adapter unit such that energy is supplied to the at least one vacuuming-off unit from the external energy supply through the adapter unit in a second operating state,
the adapter unit has at least one fastening, and
in a third configuration with the adapter unit mechanically and electrically connected to the at least one vacuuming-off device such that energy is supplied to the at least one vacuuming-off unit from the external energy supply through the adapter unit in a third operating state, the at least one fastening mechanically connects the at least one vacuuming-off unit to a further hand-held power tool through the adapter unit.

2. The vacuuming-off system according to claim 1, wherein the at least one connecting unit is configured to connect to at least one battery.

3. The vacuuming-off system according to claim 1, wherein the adapter unit has at least one actuating element configured to activate and/or deactivate the at least one vacuuming-off unit.

4. The vacuuming-off system according to claim 1, wherein the adapter unit has at least one handle.

5. The vacuuming-off system according to claim 1, further comprising at least one vacuuming-off nozzle configured to be placed on and/or attached to the at least one vacuuming-off unit.

6. The vacuuming-off system according to claim 1, wherein the adapter unit has at least one sensor unit that is configured, in the second configuration, to identify at least one activation state of the further hand-held power tool.

7. The vacuuming-off system according to claim 6, wherein the adapter unit is configured, in the second configuration, to activate and/or deactivate the at least one vacuuming-off unit in dependence on the identified at least one activation state.

8. The vacuuming-off system according to claim 1, wherein the hand-held power tool is configured as a hammer drill and/or a chipping hammer.

9. The vacuuming-off system according to claim 1, wherein:
the fastening element is a latching element.

10. An adapter unit for a vacuuming-off device, comprising:
a single, contiguous body configured to removably directly electrically connect the adapter unit to an electrical contact point of a vacuuming-off unit interface and removably directly mechanically connect the adapter unit to a fastening element of the vacuuming-off unit interface, the vacuuming-off unit interface configured for removable mechanical and electrical connection to a hand-held power tool;
at least one connecting unit configured to connect to at least one external energy supply so as to provide energy to the vacuuming-off unit in a first operational configuration; and
at least one fastening configured to mechanically connect the adapter unit to a further hand-held power tool while the adapter unit is removably directly electrically connected to the electrical contact point of the vacuuming-off unit interface and removably directly mechanically connected to the fastening element of the vacuuming-off unit interface.

11. A system, comprising:
a first hand-held power tool;
a further hand-held power tool configured differently from the first hand-held power tool;
an external energy supply;
a vacuuming-off device, including at least one vacuuming-off unit having at least one interface, the at least one interface including a fastening element and an electrical contact point; and
an adapter unit having at least one connecting unit configured to connect to the external energy supply, wherein:
in a first configuration with the adapter unit removed from the vacuuming-off device and the vacuuming-off device mechanically connected to the first hand-held power tool, the fastening element mechanically connects the vacuuming-off unit directly to the first hand-held power tool, the electrical contact point electrically connects the vacuuming-off unit directly to the first hand-held power tool, and the first hand-held power tool is mechanically connected with the external energy supply such that in a first operational state energy from the external energy supply is supplied to the vacuuming-off unit through the first hand-held power tool, and
in a second configuration, with the vacuuming-off device mechanically connected to the further hand-held power tool, the fastening element mechanically connects the vacuuming-off unit directly to the adapter unit, the electrical contact point electrically connects the vacuuming-off unit directly to the adapter unit, and the adapter is mechanically and electrically connected to the external energy supply such that in a second operational state energy from the external energy supply is supplied to the vacuuming-off unit through the adapter unit.

12. The system according to claim 11, wherein the first hand-held power tool is configured as a hammer drill and/or a chipping hammer.

* * * * *